(12) United States Patent
Ishihara

(10) Patent No.: US 8,958,396 B2
(45) Date of Patent: Feb. 17, 2015

(54) TRAIN CONTROL SYSTEM AND HANDOVER METHOD IN TRAIN CONTROL SYSTEM

(75) Inventor: Mikihisa Ishihara, Tokyo (JP)

(73) Assignee: Mitsubishi Electric Corporation, Chiyoda-Ku, Tokyo (JP)

(*) Notice: Subject to any disclaimer, the term of this patent is extended or adjusted under 35 U.S.C. 154(b) by 219 days.

(21) Appl. No.: 13/579,058

(22) PCT Filed: Feb. 19, 2010

(86) PCT No.: PCT/JP2010/052547
§ 371 (c)(1),
(2), (4) Date: Aug. 15, 2012

(87) PCT Pub. No.: WO2011/101983
PCT Pub. Date: Aug. 25, 2011

(65) Prior Publication Data
US 2012/0320875 A1 Dec. 20, 2012

(51) Int. Cl.
*H04W 4/00* (2009.01)
*B61L 15/00* (2006.01)
(Continued)

(52) U.S. Cl.
CPC .............. *B61L 15/0027* (2013.01); *B60L 15/40* (2013.01); *B61L 27/0005* (2013.01); *H04W 28/26* (2013.01); *H04W 36/08* (2013.01); *H04W 48/08* (2013.01)
USPC ............ 370/334; 370/329; 370/331; 370/431

(58) Field of Classification Search
USPC .................................. 370/329, 331, 334, 431
See application file for complete search history.

(56) References Cited

U.S. PATENT DOCUMENTS 6,052,598 A * 4/2000 Rudrapatna et al. ........ 455/456.1
8,019,345 B2 * 9/2011 Kwun et al. ................... 455/439
(Continued)

FOREIGN PATENT DOCUMENTS

CN        1247010 A      3/2000
JP     2000-165312 A     6/2000
(Continued)

OTHER PUBLICATIONS

International Search Report (PCT/ISA/210) issued on May 25, 2010, by the Japanese Patent Office as the International Searching Authority for International Application No. PCT/JP2010/052547.
(Continued)

*Primary Examiner* — Phuc Tran
(74) *Attorney, Agent, or Firm* — Buchanan Ingersoll & Rooney PC

(57) ABSTRACT

A ground control apparatus is provided with: a train speed calculation unit that calculates train speed by using train present track position information notified from a train; a predicted passage time calculation unit that calculates a predicted passage time at a previously-stored H/O point based on the H/O point, the calculated train speed, and brake performance; a wireless CH reservation unit that performs processing of reserving a wireless CH of a H/O target wireless base station based on usage of a wireless channel allocated to the H/O target wireless base station and the calculated predicted passage time; and a wireless CH reservation result notification unit that notifies a reservation result of the wireless CH reservation unit to a H/O source wireless base station.

20 Claims, 9 Drawing Sheets

(51) Int. Cl.
   B60L 15/40   (2006.01)
   B61L 27/00   (2006.01)
   H04W 28/26   (2009.01)
   *H04W 36/08*   (2009.01)
   *H04W 48/08*   (2009.01)

(56) References Cited

U.S. PATENT DOCUMENTS

| | | | |
|---|---|---|---|
| 2003/0050064 A1* | 3/2003 | Davies et al. | 455/441 |
| 2005/0037756 A1* | 2/2005 | Yaguchi et al. | 455/436 |
| 2005/0259619 A1* | 11/2005 | Boettle et al. | 370/331 |
| 2011/0002299 A1* | 1/2011 | Venkatachalam | 370/331 |

FOREIGN PATENT DOCUMENTS

| | | |
|---|---|---|
| JP | 2004-88654 A | 3/2004 |
| JP | 2007-215238 A | 8/2007 |
| WO | 98/35511 A2 | 8/1998 |

OTHER PUBLICATIONS

Written Opinion (PCT/ISA/237) issued on May 25, 2010, by the Japanese Patent Office as the International Searching Authority for International Application No. PCT/JP2010/052547.

Office Action from Chinese Patent Office dated May 27, 2014, issued in corresponding Chinese Application No. 201080064063.3, with English translation thereof. (25 pages).

* cited by examiner

TRAIN CONTROL SYSTEM AND HANDOVER METHOD IN TRAIN CONTROL SYSTEM

FIELD

The present invention relates to a wireless-based train control system and a method of performing a handover operation in the train control system.

BACKGROUND

Among conventional examples of a wireless-based train control system, there is one disclosed in the following Patent Literature 1. According to this Patent Literature 1, whether or not a train is approaching a point (handover point) where the train actually performs a switching operation on the ground side wireless transmission apparatuses (hereinafter, referred to as "handover") is determined on the ground side in order to prevent a train control apparatus performing mobile communication from getting into a communication blackout due to the switching operation when the communicating train is moving. If the train is determined to be approaching a handover point, ground control apparatuses previously reserve a wireless channel for use in performing communication with a ground side wireless transmission apparatus for the train to communicate with the next.

CITATION LIST

Patent Literature

Patent Literature 1: Japanese Patent Application Laid-open No. 2000-165312

SUMMARY

Technical Problem

However, since the technology of the foregoing Patent Literature 1 is a method in which train position information is essential, opportunities to reserve a wireless channel are expected to decrease when train position information is not acquired, or even in a case in which train position information is acquired if the intervals of transmission of the train position information transmitted by the train are long.

In addition, in this Patent Literature 1, running speed of a train, brake performance or the like are not considered at all. When the train speed is high, timing to reserve a wireless channel is significantly delayed in combination with reduced opportunities to acquire train position information described above, and in the worst-case scenario, the train may need to stop running. The use of the technology of Patent Literature 1 therefore needs earlier reservation of wireless channels, which results in a problem that the use efficiency of wireless channel resources drops.

The present invention has been achieved in view of the foregoing, and an object thereof is to provide a train control system and a handover method in a train control system that can improve precision of reservation processing of a wireless channel and allows efficient use of wireless channel resources.

Solution to Problem

In order to solve the aforementioned problems, a train control system according to one aspect of the present invention is configured to include: a ground control apparatus for generating train control information for controlling running of a train; a plurality of wireless base stations that are connected to the ground control apparatus, the wireless base stations accepting and wirelessly transmitting the train control information; an onboard wireless station that is mounted on the train, the onboard wireless station receiving the train control information transmitted from the wireless base stations; and an onboard control apparatus that is connected to the onboard wireless station, the onboard control apparatus controlling the running of the train based on the train control information notified from the onboard wireless station, the ground control apparatus including a predicted passage time calculation unit for calculating a predicted passage time of a reservation start point at which a reservation for a wireless channel allocated for a handover target wireless base station is started, based on a handover point, calculated or notified train speed, and train present track position information notified from the train through the onboard wireless station, the handover point being stored as a point at which communication target switch wireless base stations are switched, a wireless channel reservation unit for performing processing of reserving the wireless channel based on usage of the wireless channel and the predicted passage time, and a wireless channel reservation result notification unit for notifying a wireless channel reservation result of the wireless channel reservation unit to a handover source wireless base station as one of pieces of the train control information.

Advantageous Effects of Invention

According to the train control system of the present invention, there are provided the effects of improving the precision of wireless channel reservation processing and allowing efficient use of wireless channel resources.

DESCRIPTION OF EMBODIMENTS

Hereinafter, train control systems and handover methods in train control systems according to embodiments of the present invention will be described with reference to the accompanying drawings. It should be noted that the present invention is not limited by the following embodiments.

First Embodiment (Overall Configuration of Train Control System)

Figure 1:
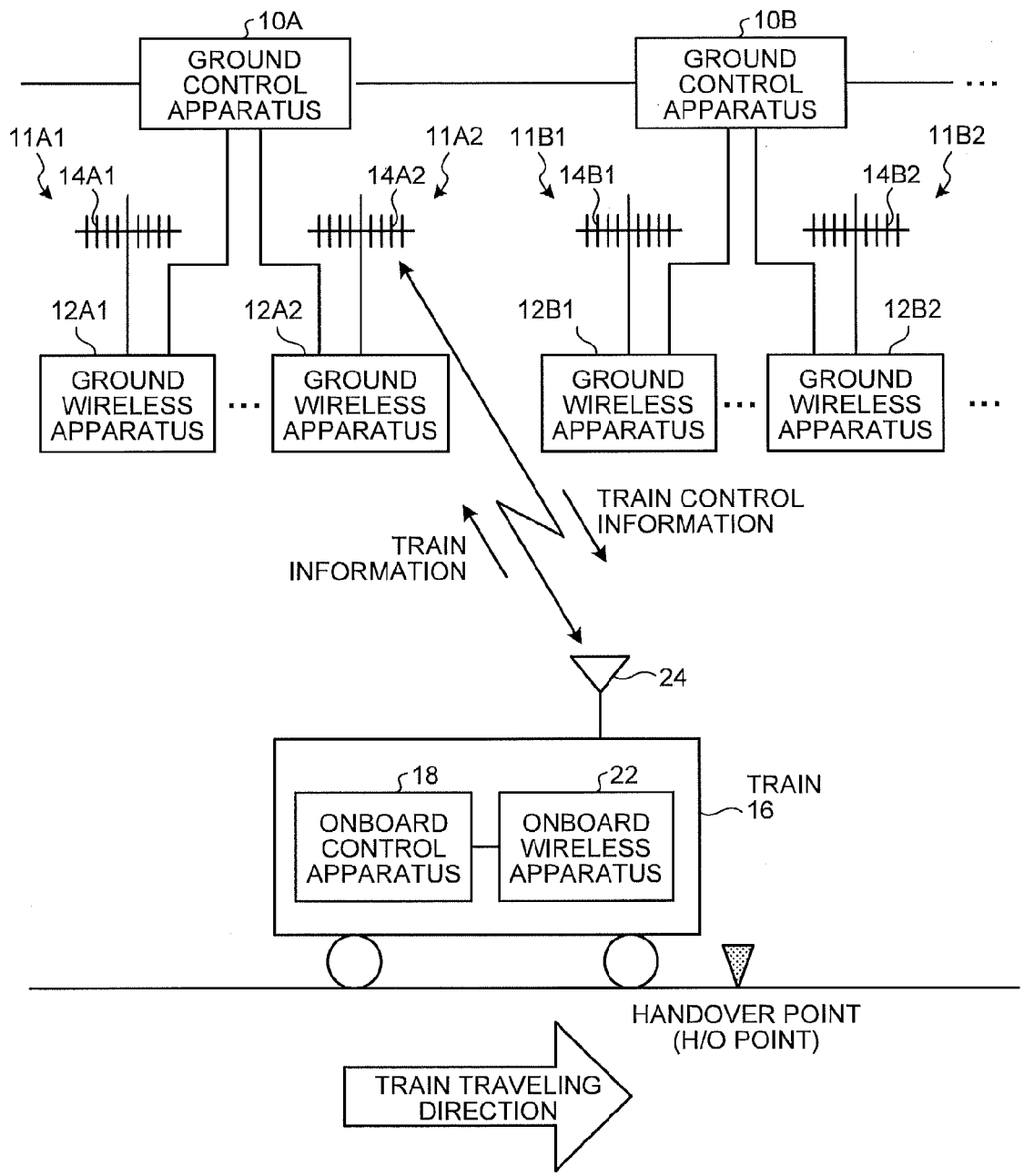
FIG. 1 is an overall block diagram for explaining a train control system according to a first embodiment of the present invention.

FIG. 1 is an overall block diagram for explaining a train control system of a first embodiment of the present invention. The train control system according to the present embodiment constitutes a mobile communication system, and can be divided into ground-side apparatuses shown in the upper section and a train 16 as a mobile apparatus shown in the lower section.

As shown in FIG. 1, the ground-side apparatuses in the train control system are configured to include ground control apparatuses 10A and 10B, wireless base stations 11A1 and 11A2 which are connected to the ground control apparatus 10A, and wireless base stations 11B1 and 11B2 which are connected to the ground control apparatus 10B. The wireless base station 11A1 is configured to include a ground wireless apparatus 12A1 and a ground aerial 14A1. The other wireless base stations are configured in the same manner.

On the other hand, the train 16 as a mobile apparatus in the train control system is configured to include an onboard control apparatus 18, an onboard wireless apparatus 22 which is connected to the onboard control apparatus 18, and an onboard aerial 24 which is connected to the onboard wireless apparatus 22. The onboard wireless apparatus 22 and the onboard aerial 24 of the train 16 serve as an onboard wireless station with respect to the wireless base stations.

As shown in the diagram, train information and train control information are transmitted and received between the wireless base stations and the onboard wireless station (train 16). The train information includes train running information and train individual information, for example. The train running information includes information on the present track position of the train (train present track position information) and information that indicates train speed. The train individual information includes information indicating the vehicle type of the train and information indicating the composition number of the train. The composition number is a number assigned to identify the train as a physical entity that is composed of vehicles. In some of the following embodiments, the composition number is used as information for identifying each individual train.

While FIG. 1 shows two ground control apparatuses as a train control system, such a configuration is not restrictive. The train control system may include three or more ground control apparatuses, or may include a single ground control apparatus.

While FIG. 1 shows the configuration where each ground control apparatus is connected with two or more wireless base stations, such a configuration is not restrictive. For example, a ground control apparatus may be connected with only a single wireless base station.

Concept of Handover Method According to the Present Embodiment

Figure 2:
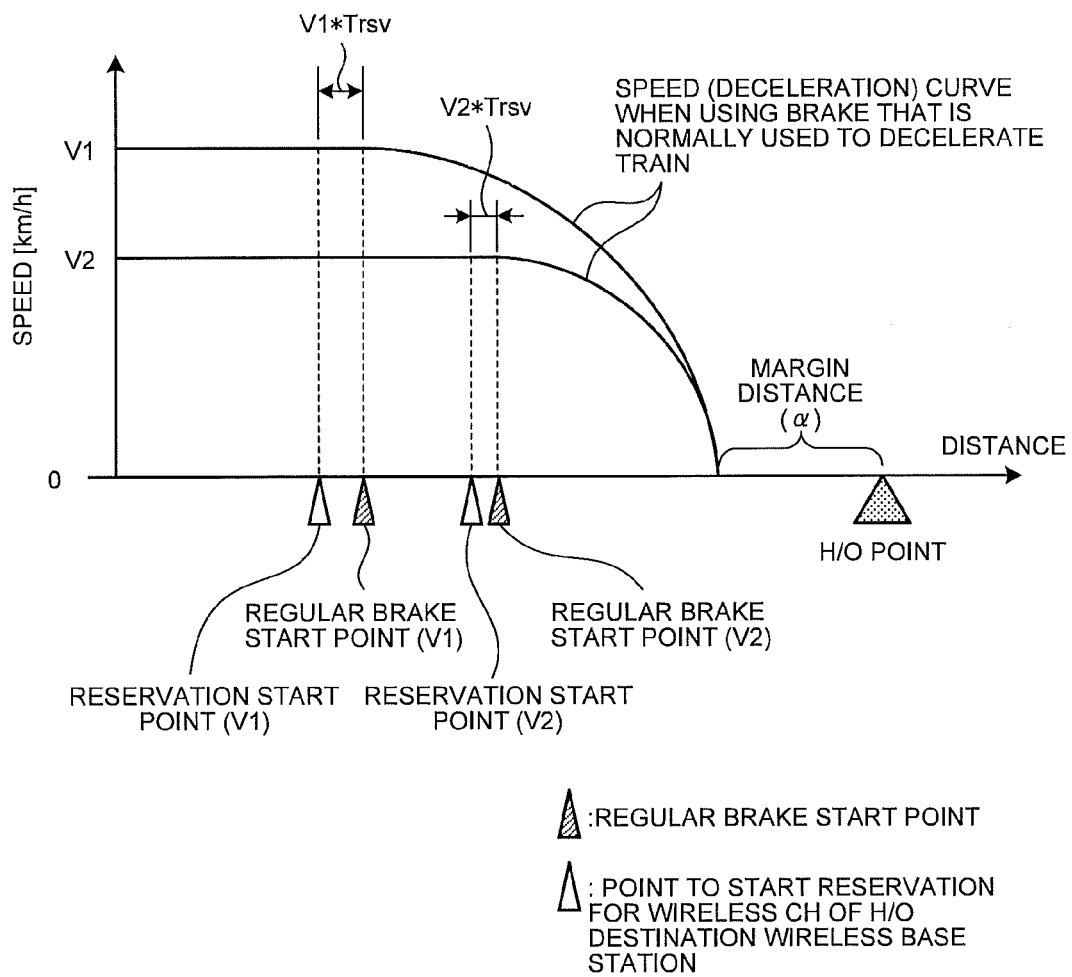
FIG. 2 is a diagram for explaining the concept of a handover method in the train control system of the present embodiment.

FIG. 2 is a diagram for explaining the concept of a handover method in the train control system of the present embodiment. As has been briefly mentioned in the "background" section, the term "handover," as employed herein, refers to an operation or control when a communicating train moves to switch wireless base stations. For example, in FIG. 1, when the train runs in the train traveling direction, the communication target needs to be switched from the wireless base station 11A2 to the wireless base station 11B1 at a near point that is shown as a handover point. The operation or control which is performed at this time is the "handover".

Returning to FIG. 2, the graph of FIG. 2 shows two curves. The two curves are speed (deceleration) curves where a normally used brake (hereinafter, referred to as "regular brake") is used to decelerate a train. The curves are shown as a relationship of a train speed (vertical axis) to a train travel distance (horizontal axis). On the horizontal axis, the points indicated by filled triangle symbols represent regular brake start point. The points indicated by open triangle symbols represent points (hereinafter, referred to as "reservation start points") at which a reservation of any one of wireless channels (hereinafter, referred to as "wireless CHs") allocated to a wireless base station for which handover (hereinafter, referred to as "H/O") is destined is started. In FIG. 2, the both of two speed curves are shown such that a reservation start point comes to a point before a regular brake start point (a point farther from the H/O point). In this respect, the explanation will be given later.

(Idea for Calculation of Reservation Start Point)

Next, the idea for the calculation of a reservation start point will be explained.

(1) First of all, a train has to stop before reaching a H/O point if no wireless CH of a H/O target wireless base station can be reserved. In such a case, the onboard control apparatus is expected to apply a brake automatically. Since it is difficult to stop the train at a desired position near the H/O point with a pinpoint precision, a certain margin distance ($\alpha$) is provided so that the train will not come to a halt beyond the H/O point (see FIG. 2).

(2) In consideration of the passengers' riding comfort, a brake that is normally used to decelerate the train (regular brake) shall be used (at the present moment, emergency brakes for emergency use are not taken into consideration). Using deceleration characteristics of the regular brake and a train speed V at a certain point, a point at which the regular brake is started (regular brake start point) is calculated so that the train speed comes to the level V=0 at a point which is the margin distance ($\alpha$) away before the H/O point.

(3) A reservation start point falls on a point before the regular brake start point for a distance as much as the train travels for processing time (Trsv) for reserving one of wireless CHs allocated to the H/O target wireless base station (V*Trsv). While the distance is denoted by V*Trsv in FIG. 2, the distance is actually a time integral of V from 0 to Trsv. If a speed change is not so large, V*Trsv may be calculated without much errors.

The processing time Trsv explained above is a processing time for reserving a wireless CH, and is defined in consideration of not only the processing time when the own ground control apparatus performs reservation processing by its own request, but also the time for requesting reservation processing of another ground control apparatus (processing time transmission time), the time for another ground control apparatus to perform reservation processing and make a notification to its own ground control apparatus (processing time+ transmission time), etc. As can be seen from this explanation, the processing time Trsv includes no element related to the foregoing margin distance $\alpha$.

The above explanation also shows that the reservation start point varies with the speed of the train and the regular brake characteristics. More specifically, the higher the train speed, the greater the distance between the reservation start point and the H/O point becomes, and the lower the train speed, the smaller the distance between the reservation start point and the H/O point becomes. A similar operation applies to the regular brake characteristics. The lower the deceleration performance, the greater the distance between the reservation start point and the H/O point becomes, and the higher the deceleration performance, the smaller the distance between the reservation start point and the H/O point becomes.

(Method of Calculating Reservation Start Point Predicted Passage Time)

In FIG. 2, In order to provide easy understanding, the horizontal axis has been described as reservation start points (distances). If points (distances) are determined based on train position information transmitted from a train, the time intervals at which the train position information is transmitted need to be reduced for accurate determination of a reservation start point. Such a technique, however, has a high impact on the train-side system that processes the train position information.

Apart from this fact, if wireless environment near a reservation start point (distance) is not favorable and train position information cannot be received by the ground apparatus side due to wireless transmission errors, the train may go far beyond the reservation start point and fail to reserve a wireless CH of the H/O target wireless base station. In such a case, an emergency brake (hard brake) may possibly be used because a regular brake fails to stop the train before the H/O point.

According to the technique of the present embodiment, the ground control apparatuses therefore do not use a reservation start point (distance) to reserve a wireless CH of the H/O target wireless base station, but calculate a predicted passage time (Tpss) of the reservation start point (distance) and perform wireless CH reservation processing by using the time information. A specific procedure for calculating a reservation start point predicted passage time (Tpss) will be described below.

Initially, a regular brake start point Pbst for stopping a train before the H/O point is calculated by using information on train speed (V) and brake performance at a time point (time T) when present track position information Ptrn on the train is received from the train. There are many variations of the train speed and brake performance. Such variations will be described later.

Next, a distance between the regular brake start point Pbst and the present track position information Ptrn received from the train, (Pbst−Ptrn), is determined. In addition, a reservation start point predicted passage time Tpss is calculated by the following equation:

$$Tpss=T+(Pbst-Ptrn)/V-Trsv. \quad (1)$$

In typically expected processing, Pbst lies "ahead in the traveling direction" with respect to Ptrn. The value of "Pbst−Ptrn" is thus considered to be positive. It should be noted that train position information typically uses mileage, which increases when traveling outbound and decreases when traveling inbound. When mileage is used as train position information, the value of "Pbst−Ptrn" in the foregoing equation (1) may thus be negative even if Pbst lies "ahead in the traveling direction" with respect to Ptrn. When mileage is used as train position information, the reservation start point predicted passage time Tpss is then calculated by using the following equation where an absolute value sign is attached to "Pbst−Ptrn" in the foregoing equation (1):

$$Tpss=T+|Pbst-Ptrn|/V-Trsv. \quad (2)$$

It should be appreciated that if a difference between the reservation start point predicted passage time Tpss calculated by the foregoing equation (2) and the current time T, (Tpss−T), is negative, it means that the reservation start point has already been passed regardless of whether the regular brake start point Pbst does not lie ahead in the traveling direction or the regular brake start point Pbst lies ahead in the traveling direction. In such a case, a reservation for a wireless CH of the H/O target wireless base station will therefore be attempted immediately. In such a case, the use of brakes other than a regular brake (for example, an emergency brake or urgent brake) may be instructed to the train side in addition to the wireless CH reservation processing. Such a control can securely stop the train before the H/O point even in situations where no wireless CH of the H/O-destined wireless base station can be reserved.

If new train position information is received before the calculated reservation start point predicted passage time Tpss, Tpss is calculated again. Incidentally, if the reservation start point predicted passage time Tpss is expected to come during the reception of new train position information, it is preferred to execute the wireless CH reservation processing. The value of Trsv used in the foregoing equations (1) and (2) may be changed depending on whether the H/O target wireless base station is connected to the own ground control apparatus or connected to another ground control apparatus.

(Configuration of Ground Control Apparatus)

Figure 3:
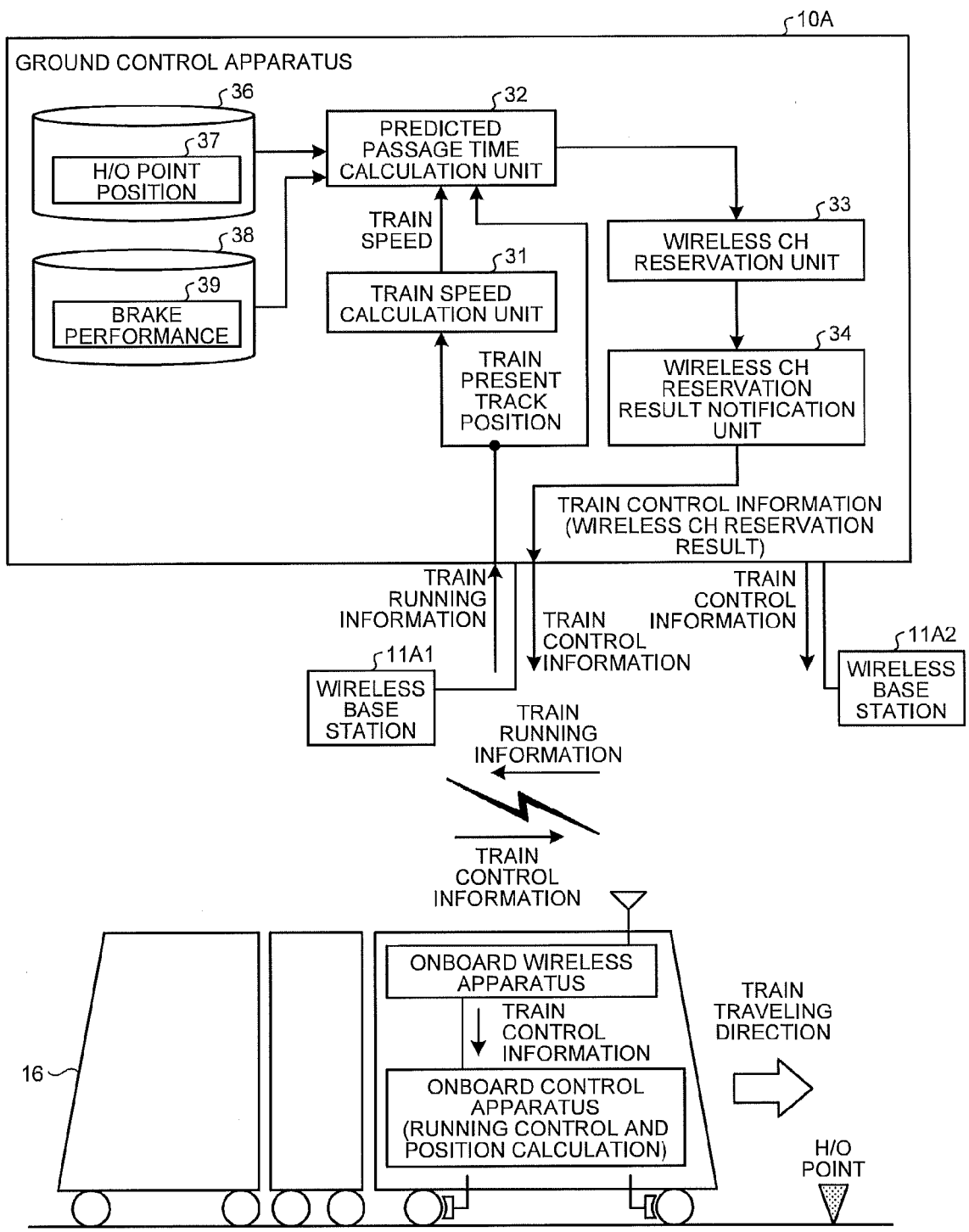
FIG. 3 is a diagram mainly showing the functional configuration of a ground control apparatus in the train control system of the first embodiment.

Next, the configuration of the ground control apparatuses will be explained. FIG. 3 is a diagram mainly showing the functional configuration of a ground control apparatus in the train control system of the first embodiment. It will be understood that while FIG. 3 shows the functional configuration of the ground control apparatus 10A shown in FIG. 1, other ground control apparatuses have the same configuration.

As shown in FIG. 3, the ground control apparatus 10A is configured to include a train speed calculation unit 31, a predicted passage time calculation unit 32, a wireless CH reservation unit 33, and a wireless CH reservation result notification unit 34, and also a storage unit 36 which stores a H/O point position 37 and a storage unit 38 which stores brake performance 39.

The train speed calculation unit 31 calculates a train speed by using information on a train present track position, which is one of pieces of train running information received on a periodical or regular basis.

The predicted passage time calculation unit 32 calculates a predicted passage time of a reservation start point based on the train present track position, the train speed calculated by the train speed calculation unit 31, a H/O point lying in the train traveling direction, and the brake performance of the train.

The wireless CH reservation unit 33 examines the usage of wireless CHs of the H/O target wireless base station and performs wireless CH reservation processing for the train.

The wireless CH reservation result notification unit 34 notifies the reservation result of a wireless CH of the H/O target wireless base station as one of pieces of train control information to the onboard control apparatus of the train through the H/O source wireless base station.

By the cooperation of the train speed calculation unit 31, the predicted passage time calculation unit 32, the wireless CH reservation unit 33, and the wireless CH reservation result notification unit 34, the same train control information as that transmitted to the H/O source wireless base station can also be transmitted to the H/O target wireless base station where a wireless CH is successfully reserved. The onboard wireless station can thus seamlessly receive the train control information by changing to the wireless CH of the H/O target wireless base station.

Effects of Train Control System of First Embodiment

Next, the effects of the use of the train control system of the first embodiment will be described in comparison with the foregoing Patent Literature 1.

Initially, the train control system of Patent Literature 1 determines timing for reserving a wireless CH based on train present track position information transmitted from a train. Consequently, there is a disadvantage that if the train present track position information is transmitted at long intervals, the timing to reserve a wireless CH of the H/O target wireless base station is delayed significantly. On the other hand, the train control system of the first embodiment does use train present track position information but also calculates a predicted passage time of a wireless CH reservation start point and determines the timing to reserve a wireless CH based on the predicted passage time. A wireless CH of the H/O target wireless base station can thus be reserved with high precision regardless of the transmission intervals of the train present track position information.

In the train control system of the first embodiment, if new train present track position information is received before the timing to reserve a wireless CH comes, the predicted passage time of the reservation start point is recalculated by using the new train present track position information. This allows high-precision wireless CH reservation processing in conformity to the train present track position information.

In the train control system of the first embodiment, a wireless CH of the H/O target wireless base station can be reserved even when wireless communications between the train and the ground-side apparatuses are temporarily disconnected (i.e., no train present track position information arrives). This can avoid a phenomenon such that the train fails to stop before the H/O point and overruns, or an urgent brake is applied in front of the H/O point.

The train control system of the first embodiment takes account of train speed and brake performance, and is thus capable of wireless CH reservation processing with even higher precision. This allows efficient use of wireless channel resources each wireless base station has.

As has been described above, according to the train control system of the first embodiment, a predicted passage time at a H/O point is calculated based on the H/O point, the present track position, brake performance, and train speed of the train. The processing of reserving a wireless CH of the H/O target wireless base station is performed based on the usage of wireless channels allocated to the H/O target wireless base station and the predicted passage time calculated. The reservation result is notified to the onboard control apparatus of the train as one of pieces of train control information through the H/O source wireless base station. This improves the precision of the wireless CH reservation processing and allows efficient use of the wireless channel resources.

The train control system of the first embodiment performs H/O processing in consideration of both train speed and brake performance. If, for example, the traveling route includes neither mountainous terrains nor many ups and downs etc., H/O processing using only train speed information may be performed. Such processing can also provide the foregoing effects.

Second Embodiment

Figure 4:
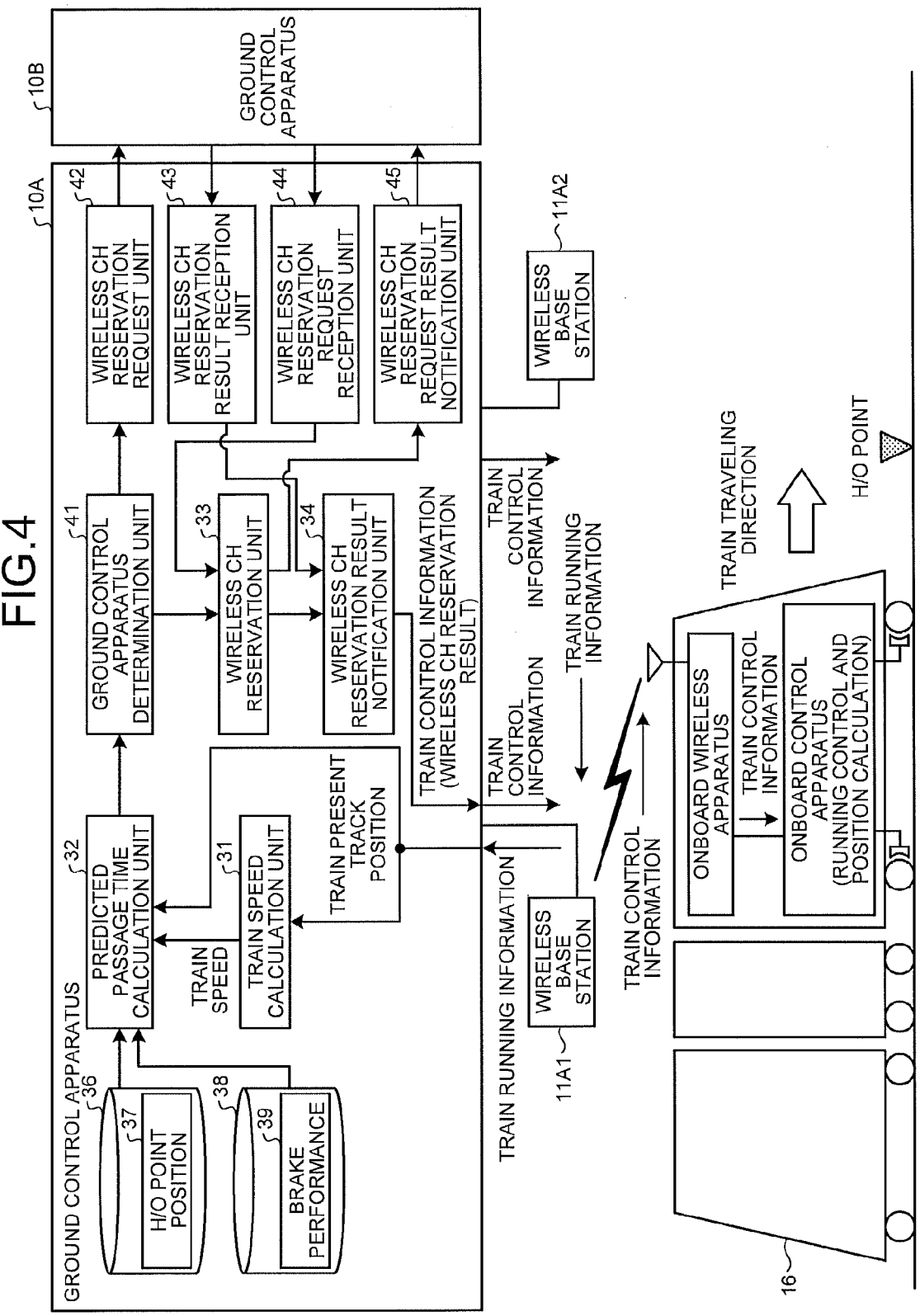
FIG. 4 is a diagram mainly showing the functional configuration of a ground control apparatus in a train control system of a second embodiment.

FIG. 4 is a diagram mainly showing the functional configuration of a ground control apparatus in a train control system of a second embodiment. The first embodiment has been described on the assumption that the train control system includes only a single ground control apparatus, or the H/O source wireless base station and the H/O target wireless base station are under the control of the same ground control apparatus. The second embodiment deals with an embodiment on the assumption that the train control system includes a plurality of ground control apparatuses and the H/O source wireless base station and the H/O target wireless base station are not under the control of the same ground control apparatus. The train control system of the second embodiment will be described below. Components identical or equivalent to those of the configuration of the first embodiment shown in FIG. 3 will be designated by the same reference numerals, and a redundant description will be omitted.

As shown in FIG. 4, the ground control apparatus 10A includes a ground control apparatus determination unit 41, a wireless CH reservation request unit 42, a wireless CH reservation result reception unit 43, a wireless CH reservation request reception unit 44, and a wireless CH reservation request result notification unit 45 in addition to the components shown in FIG. 3.

The ground control apparatus determination unit 41 determines whether the H/O target wireless base station is under the control of its own ground control apparatus based on information on a system configuration, the traveling direction of the train, etc.

If the ground control apparatus determination unit 41 determines that the H/O target wireless base station is not under the control of the own apparatus, the wireless CH reservation request unit 42 transmits a wireless CH reservation request to the ground control apparatus that has control over the H/O target wireless base station (in the example of FIG. 4, the ground control apparatus 10B).

The wireless CH reservation result reception unit 43 receives a reservation result from the ground control apparatus to which the wireless CH reservation request is transmitted (in the example of FIG. 4, the ground control apparatus 10B), and notifies the reservation result to the wireless CH reservation result notification unit 34.

The wireless CH reservation request reception unit 44 receives a reservation request from a ground control apparatus that has control over a H/O source wireless base station (in the example of FIG. 4, the ground control apparatus 10B), and notifies the reservation request to the wireless CH reservation unit 33.

The wireless CH reservation request result notification unit 45 receives the result of reservation made by the wireless CH reservation unit 33 (reservation request result) and transmits the result of reservation to the reservation-requesting ground control apparatus (in the example of FIG. 4, the ground control apparatus 10B).

By the cooperation of the train speed calculation unit 31, the predicted passage time calculation unit 32, the wireless CH reservation unit 33, and the wireless CH reservation result notification unit 34 described in the first embodiment as well as the ground control apparatus determination unit 41, the wireless CH reservation request unit 42, the wireless CH reservation result reception unit 43, the wireless CH reservation request reception unit 44, and the wireless CH reservation request result notification unit 45, wireless base stations can be appropriately switched during H/O regardless of whether the H/O source wireless base station and the H/O target wireless base station are under the control of the same ground control apparatus.

As has been described above, according to the train control system of the second embodiment, a predicted passage time at a H/O point is calculated based on the H/O point, the present track position, brake performance, and train speed of the train. If the H/O source wireless base station and the H/O target wireless base station are not under the control of the same ground control apparatus, the ground control apparatus that has control over the H/O target wireless base station is requested to reserve a wireless channel. If the H/O source wireless base station and the H/O target wireless base station are under the control of the same ground control apparatus, processing of reserving a wireless channel of the H/O target wireless base station is performed based on the usage of wireless channels allocated to the H/O target wireless base station and the predicted passage time. If a wireless channel reservation request is received from another ground control apparatus, processing of reserving a wireless channel is performed based on the usage of wireless channels allocated to the reservation-requested wireless base station, and a notification is made to the other ground control apparatus that has transmitted the wireless CH reservation request. Consequently, in addition to the effects of the first embodiment, there is obtained the effect of allowing appropriate switching of wireless base stations during H/O regardless of whether the H/O source wireless base station and the H/O target wireless base station are under the control of same ground control apparatus.

Third Embodiment

Figure 5:
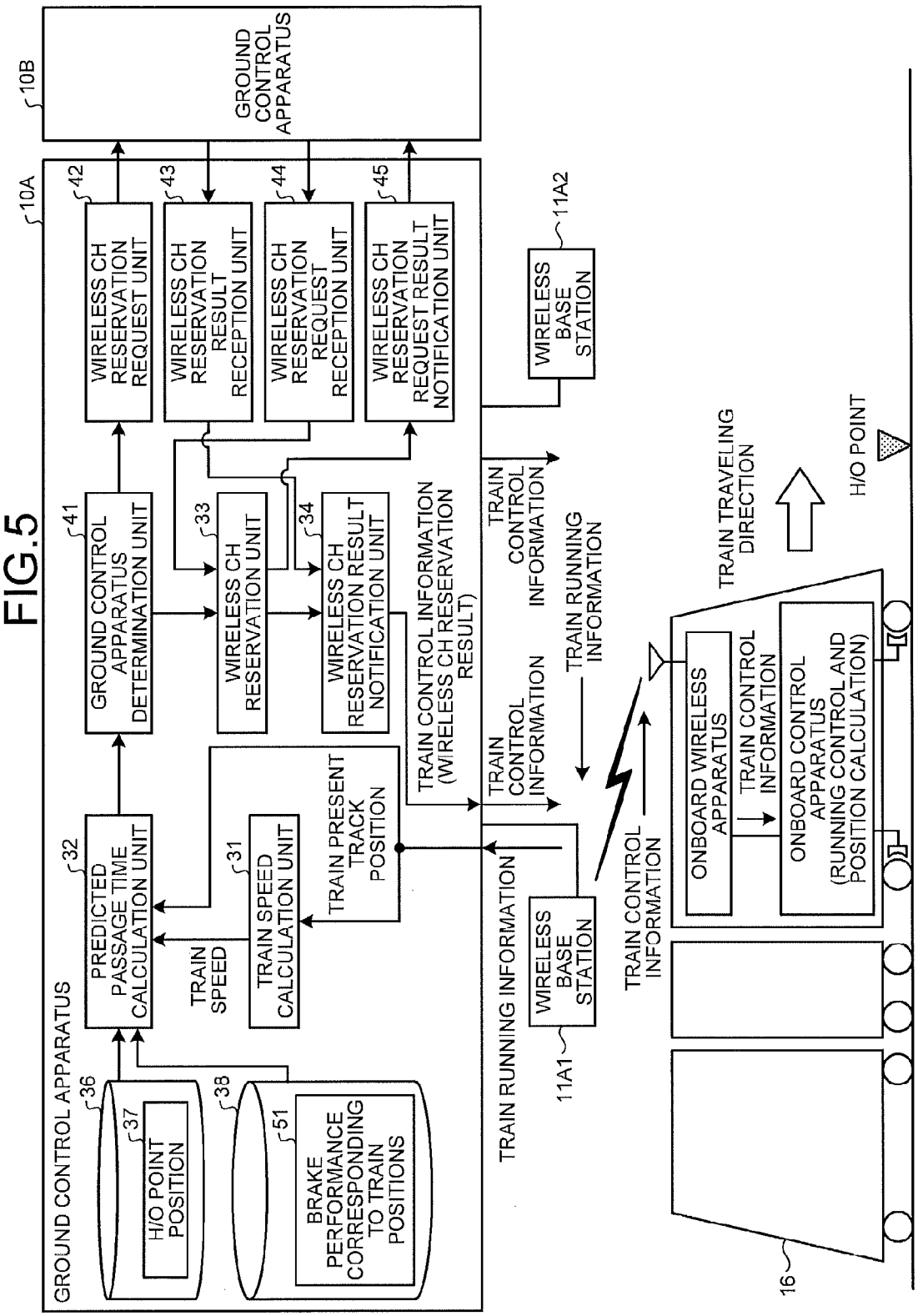
FIG. 5 is a diagram mainly showing the functional configuration of a ground control apparatus in a train control system of a third embodiment.

FIG. 5 is a diagram mainly showing the functional configuration of a ground control apparatus in a train control system of a third embodiment. The second embodiment has dealt with an example where the brake performance of the train has constant characteristics independent of the train. The third embodiment deals with an embodiment where the brake performance of the train varies with the present track position of the train. The present track position of the train is taken into account because the brake performance varies depending on whether the track is upslope or downslope. The train control system of the third embodiment will be described below. Components identical or equivalent to those of the configuration of the second embodiment shown in FIG. 4 will be designated by the same reference numerals, and a redundant description will be omitted.

In the third embodiment, the storage unit 38 contains brake performance 51 which is brake performance information corresponding to train positions (train present track positions).

The predicted passage time calculation unit 32 calculates a predicted passage time of a reservation start point based on a train present track position, the train speed calculated by the train speed calculation unit 31, a H/O point lying in the train traveling direction, and the brake performance of the train corresponding to the train present track position.

According to the train control system of the third embodiment, the predicted passage time of a reservation start point is calculated based on the brake performance corresponding to the train present track position. This provides the effect of improving the precision of the wireless CH reservation processing in addition to the effects of the second embodiment.

While the third embodiment has dealt with the case where the configuration for performing the processing of calculating the predicted passage time of a reservation start point based on the brake performance corresponding to the train present track position is applied to the second embodiment, it will be understood that such a configuration is also applicable to the first embodiment.

Fourth Embodiment

Figure 6:
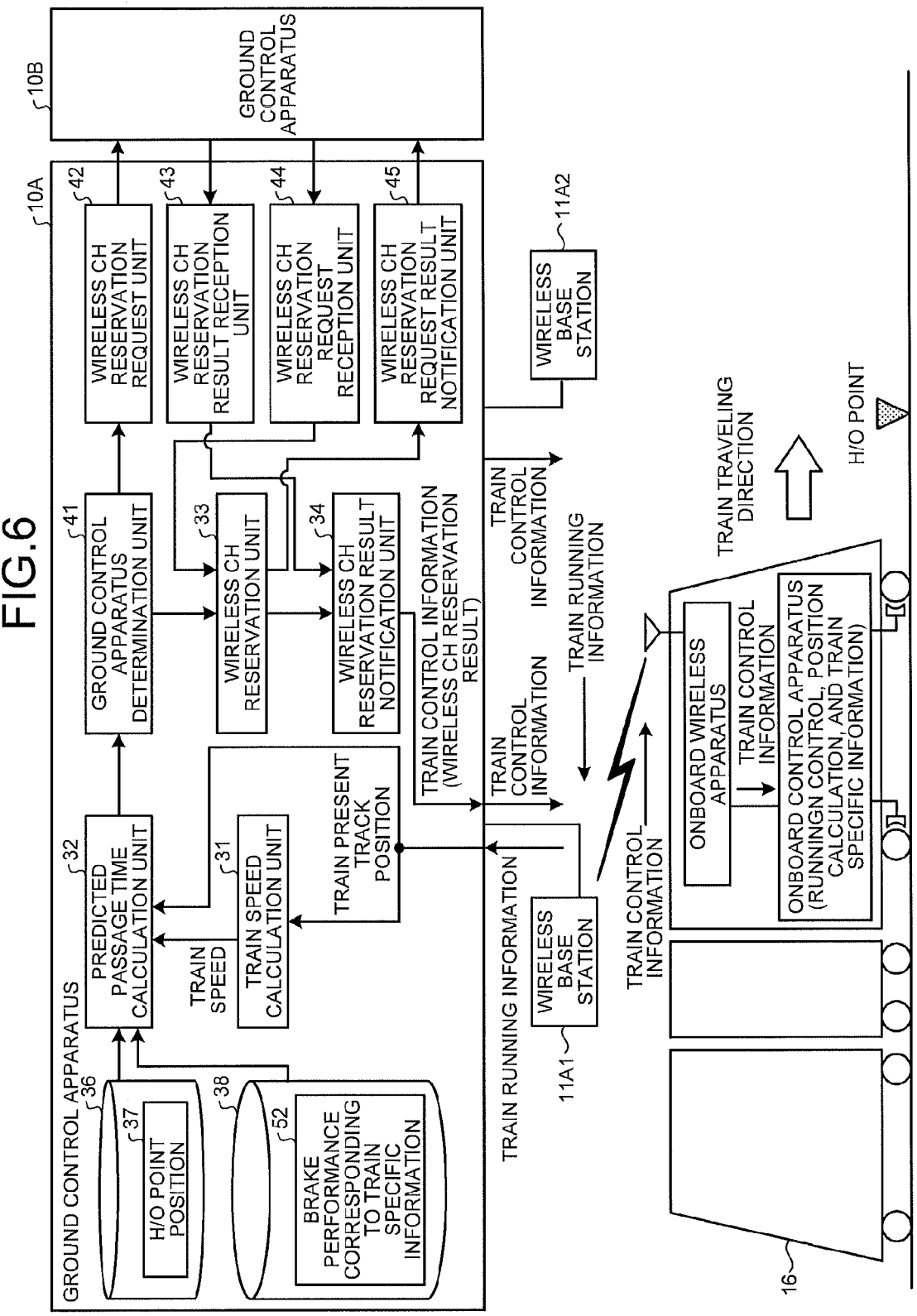
FIG. 6 is a diagram mainly showing the functional configuration of a ground control apparatus in a train control system of a fourth embodiment.

FIG. 6 is a diagram mainly showing the functional configuration of a ground control apparatus in a train control system of a fourth embodiment. The third embodiment has dealt with an embodiment where the brake performance of a train changes with the present track position of the train. The fourth embodiment deals with an embodiment where the brake performance of a train changes with train individual information (such as vehicle type and composition number). The train control system of the fourth embodiment will be explained below. Components identical or equivalent to those of the configuration of the second embodiment shown in FIG. 4 will be designated by same reference numerals, and a redundant description will be omitted.

In the fourth embodiment, the storage unit 38 contains brake performance 52 which is brake performance information corresponding to train individual information. The train individual information is notified to the ground control apparatus 10A through the wireless base station 11A1.

The predicted passage time calculation unit 32 calculates a predicted passage time of a reservation start point based on the train present track position, the train speed calculated by the train speed calculation unit 31, a H/O point lying in the train traveling direction, and the brake performance corresponding to the train individual information.

According to the train control system of the fourth embodiment, the predicted passage time of a reservation start point is calculated based on the brake performance corresponding to the train individual information. This provides the effect of improving the precision of wireless CH reservation processing in addition to the effects of the second embodiment.

While the fourth embodiment has dealt with the case where the configuration for performing the processing of calculating the predicted passage time of a reservation start point based on the brake performance corresponding to the train individual information is applied to the second embodiment, it will be understood that such a configuration is also applicable to the first embodiment.

Fifth Embodiment

Figure 7:
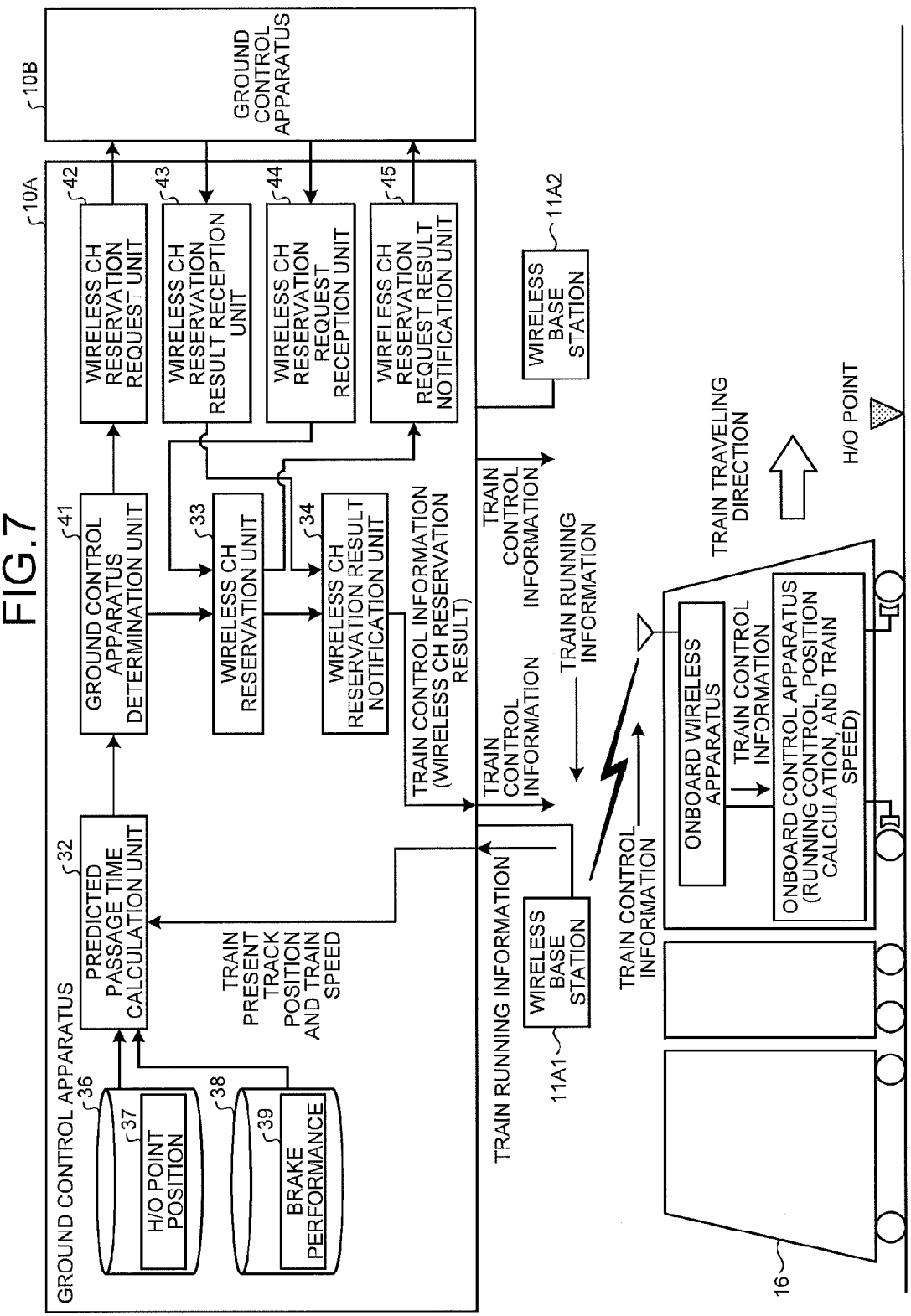
FIG. 7 is a diagram mainly showing the functional configuration of a ground control apparatus in a train control system of a fifth embodiment.

FIG. 7 is a diagram mainly showing the functional configuration of a ground control apparatus in a train control system of a fifth embodiment. The second embodiment has dealt with an embodiment where train speed is calculated on the ground control apparatus side by using train present track position information notified by the train. The fifth embodiment deals with an embodiment where information on train speed measured by a train is transmitted to a ground control apparatus along with present track position information, and the ground control apparatus uses the value. Due to such an embodiment, the train speed calculation unit 31 may be omitted from the configuration of the second embodiment shown in FIG. 4. The train control system of the fifth embodiment will be described below. Components identical or equivalent to those of the configuration of the second embodiment shown in FIG. 4 will be designated by same reference numerals, and a redundant description will be omitted.

In the fifth embodiment, train speed is calculated by the onboard control apparatus of the train 16. The train speed is notified to the ground control apparatus 10A through the wireless base station 11A1 as one of pieces of train running information along with information on the train present track position.

The predicted passage time calculation unit 32 calculates a predicted passage time of a reservation start point based on the train present track position and train speed notified by the train 16, a H/O point lying in the train traveling direction, and brake performance.

According to the train control system of the fifth embodiment, the train speed calculation unit 31 can be omitted. This provides the effect of reducing the processing load on the ground control apparatus side and using more accurate train speed, and also the effect of improving the precision of wireless CH reservation processing in addition to the effects of the second embodiment.

While the fifth embodiment has dealt with the case where the configuration for performing the processing of calculating the predicted passage time of a reservation start point by using information on train speed calculated on the onboard control apparatus side is applied to the second embodiment, it will be understood that such a configuration is also applicable to the first, third, and fourth embodiments.

Sixth Embodiment

Figure 8:
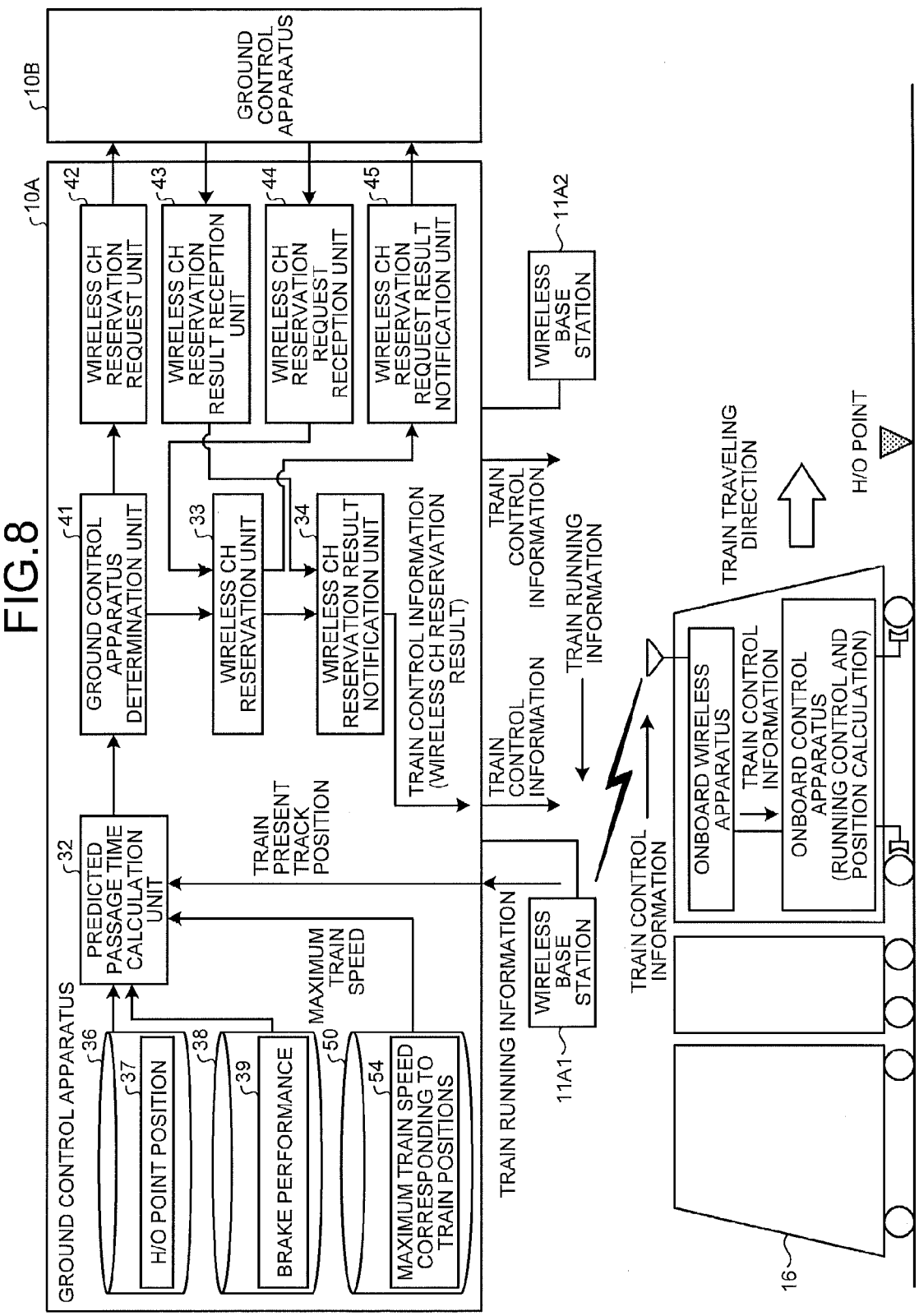
FIG. 8 is a diagram mainly showing the functional configuration of a ground control apparatus in a train control system of a sixth embodiment.

FIG. 8 is a diagram mainly showing the functional configuration of a ground control apparatus in a train control system of a sixth embodiment. The second embodiment has dealt with an embodiment where the train speed calculation unit 31 of the ground control apparatus 10A calculates train speed by using train present track position information notified by the train 16. The sixth embodiment deals with an embodiment where the train speed is not dependent on train individual information, and a maximum train speed that can be determined from present track position is used. Due to such an embodiment, the train speed calculation unit 31 may be omitted from the configuration of the second embodiment shown in FIG. 4. The train control system of the sixth embodiment will be described below. Components identical or equivalent to those of the configuration of the second embodiment shown in FIG. 4 will be designated by same reference numerals, and redundant description will be omitted.

The sixth embodiment includes a storage unit 50, The storage unit 50 contains a maximum train speed 54 corresponding to train positions (train present track positions).

The predicted passage time calculation unit 32 calculates a predicted passage time of a reservation start point based on a train present track position, a H/O point lying in the train traveling direction, brake performance, and the maximum train speed corresponding to the train present track position.

According to the train control system of the sixth embodiment, the predicted passage time of a reservation start point is calculated based on the maximum train speed corresponding to the train present track position. The train speed calculation unit 31 can thus be omitted, and there is provided the effect of reducing the processing load on the ground control apparatus side in addition to the effects of the second embodiment.

While the sixth embodiment has dealt with the case where the configuration for performing the processing of calculating the predicted passage time of a reservation start point based on the maximum train speed corresponding to the train present track position is applied to the second embodiment, such a configuration is also applicable to the first and third to fifth embodiments.

Seventh Embodiment

Figure 9:
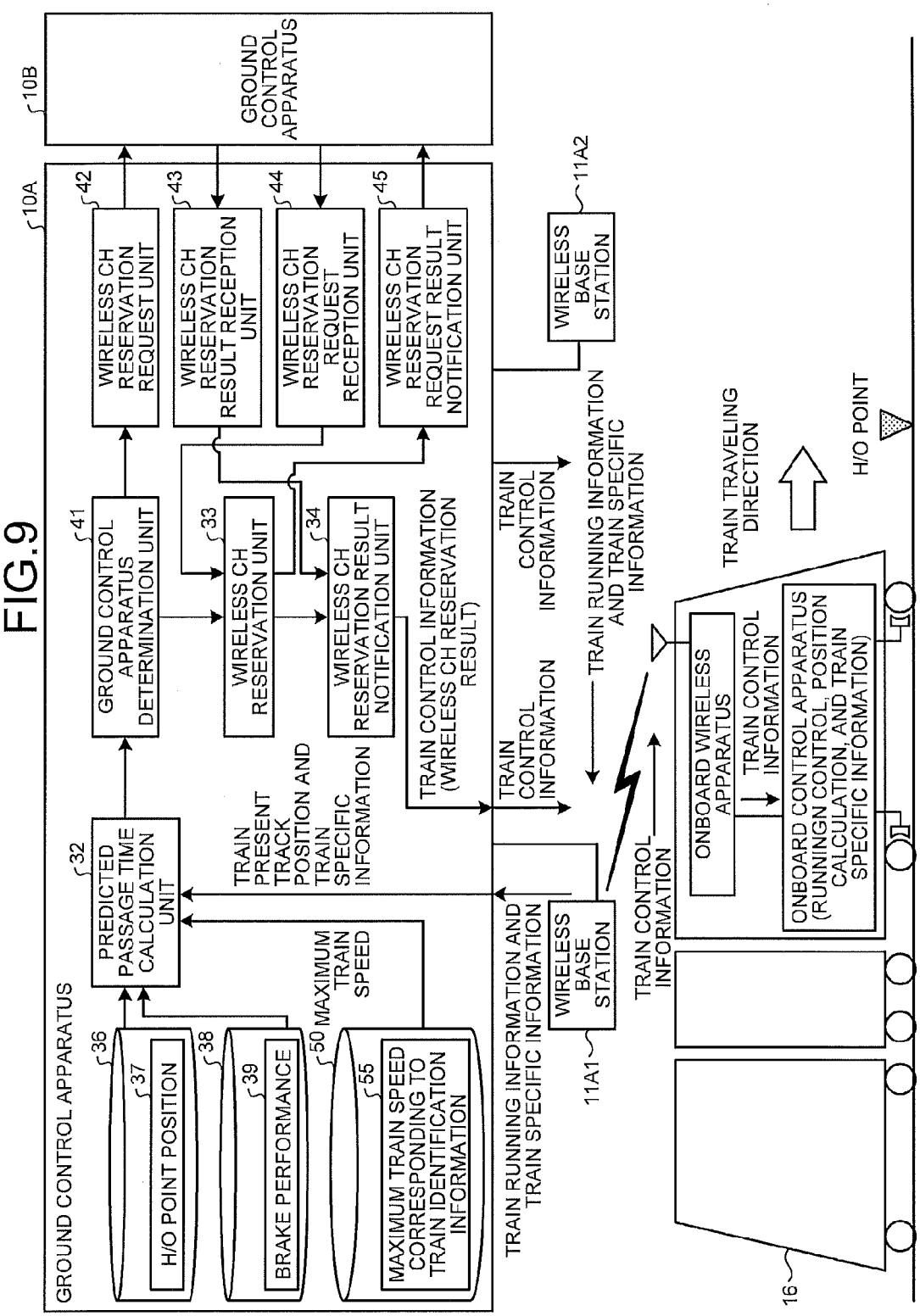
FIG. 9 is a diagram mainly showing the functional configuration of a ground control apparatus in a train control system of a seventh embodiment.

FIG. 9 is a diagram mainly showing the functional configuration of a ground control apparatus in a train control system of a seventh embodiment. The sixth embodiment has dealt with an embodiment where the train speed is not dependent on train individual information, and a maximum train speed that can be determined from its present track position is used to calculate a predicted passage time. In contrast, the seventh embodiment deals with an embodiment where the train speed is not dependent on the train present track position, and a maximum train speed that varies with train individual information (vehicle type and composition number) is used to calculate a predicted passage time. Due to such an embodiment, like the sixth embodiment, the train speed calculation unit 31 may be omitted from the configuration of the second embodiment shown in FIG. 4. The train control system of the seventh embodiment will be described below. Components identical or equivalent to those of the configuration of the sixth embodiment shown in FIG. 8 will be designated by same reference numerals, and a redundant description will be omitted.

In the seventh embodiment, the storage unit 50 contains a maximum train speed 55 corresponding to train identification information. Information on a train present track position regularly notified through the wireless base station 11A1 is notified to the predicted passage time calculation unit 32.

The predicted passage time calculation unit 32 calculates a predicted passage time of a reservation start point based on the train present track position, a H/O point lying in the train traveling direction, brake performance, and the maximum train speed corresponding to the train individual information.

According to the train control system of the seventh embodiment, the predicted passage time of a reservation start point is calculated based on the maximum train speed corresponding to the train individual information. The train speed calculation unit 31 can thus be omitted, and there is provided the effect of reducing the processing load on the ground control apparatus side in addition to the effects of the second embodiment.

While the seventh embodiment has dealt with the case where the configuration for performing the processing of calculating the predicted passage time of a reservation start point based on the maximum train speed corresponding to the train individual information is applied to the second embodiment, such a configuration is also applicable to the first and third to sixth embodiments.

INDUSTRIAL APPLICABILITY

As described above, the train control system according to the present invention is useful as an invention that allows efficient use of wireless channel resources.

REFERENCE SIGNS LIST 10A, 10B GROUND CONTROL APPARATUS
11A1, 11A2, 11B1, 11B2 WIRELESS BASE STATION
12A1, 12A2, 12B1, 12B2 GROUND WIRELESS APPARATUS
14A1, 14A2, 14B1, 14B2 GROUND AERIAL
16 TRAIN
18 ONBOARD CONTROL APPARATUS
22 ONBOARD WIRELESS APPARATUS
24 ONBOARD AERIAL
31 TRAIN SPEED CALCULATION UNIT
32 PREDICTED PASSAGE TIME CALCULATION UNIT
33 WIRELESS CH RESERVATION UNIT
34 WIRELESS CH RESERVATION RESULT NOTIFICATION UNIT
36, 38, 50 STORAGE UNIT
41 GROUND CONTROL APPARATUS DETERMINATION UNIT
42 WIRELESS CH RESERVATION REQUEST UNIT
43 WIRELESS CH RESERVATION RESULT RECEPTION UNIT

44 WIRELESS CH RESERVATION REQUEST RECEPTION UNIT
45 WIRELESS CH RESERVATION REQUEST RESULT NOTIFICATION UNIT

The invention claimed is:

1. A train control system comprising:
a ground control apparatus for generating train control information for controlling running of a train;
a plurality of wireless base stations that are connected to the ground control apparatus, the wireless base stations accepting and wirelessly transmitting the train control information;
an onboard wireless station that is mounted on the train, the onboard wireless station receiving the train control information transmitted from the wireless base stations; and
an onboard control apparatus that is connected to the onboard wireless station, the onboard control apparatus controlling the running of the train based on the train control information notified from the onboard wireless station,
the ground control apparatus including
a predicted passage time calculation unit for calculating a predicted passage time of a reservation start point at which a reservation for a wireless channel allocated for a handover target wireless base station is started, based on a handover point, calculated or notified train speed, and train present track position information notified from the train through the onboard wireless station, the handover point being stored as a point at which communication target switch wireless base stations are switched,
a wireless channel reservation unit for performing processing of reserving the wireless channel based on usage of the wireless channel and the predicted passage time, and
a wireless channel reservation result notification unit for notifying a wireless channel reservation result of the wireless channel reservation unit to a handover source wireless base station as one of pieces of the train control information.

2. The train control system according to claim 1, wherein the ground control apparatus further includes a train speed calculation unit for calculating the train speed based on the train present track position information notified from the train through the onboard wireless station.

3. The train control system according to claim 1, wherein information on the train speed needed to calculate the predicted passage time is calculated by the train and notified to the ground control apparatus.

4. The train control system according to claim 1, wherein the predicted passage time calculation unit uses information on train maximum speed as the train speed when calculating the predicted passage time, the train maximum speed being determined according to the train present track position information on the train.

5. The train control system according to claim 1, wherein:
train individual information for identifying the train is notified to the ground control apparatus as information needed to calculate the predicted passage time; and
the predicted passage time calculation unit uses information on train maximum speed as the train speed when calculating the predicted passage time, the train maximum speed being determined according to the train individual information.

6. The train control system according to claim 5, wherein the predicted passage time calculation unit calculates the predicted passage time in consideration of brake performance that is set to different characteristics depending on the train individual information.

7. The train control system according to claim 5, wherein the predicted passage time calculation unit calculates the predicted passage time in consideration of brake performance that is set to different characteristics depending on the train individual information and the train present track position information, respectively.

8. The train control system according to claim 1, wherein:
train individual information for identifying the train is notified to the ground control apparatus as information needed to calculate the predicted passage time; and
the predicted passage time calculation unit uses information on train maximum speed as the train speed when calculating the predicted passage time, the train maximum speed being determined according to the train individual information and the train present track position information.

9. The train control system according to claim 8, wherein the predicted passage time calculation unit calculates the predicted passage time in consideration of brake performance that is set to different characteristics depending on the train individual information.

10. The train control system according to claim 8, wherein the predicted passage time calculation unit calculates the predicted passage time in consideration of brake performance that is set to different characteristics depending on the train individual information and the present track position information, respectively.

11. The train control system according to claim 1, wherein the predicted passage time calculation unit calculates the predicted passage time in consideration of brake performance of the train.

12. The train control system according to claim 11, wherein the brake performance is set to different characteristics depending on a present track position of the train.

13. The train control system according to claim 1, wherein the reservation start point is located before, in terms of a traveling direction, a point at which a brake operation is started in order to stop the train at the handover point.

14. The train control system according to claim 13, wherein the reservation start point is set in consideration of train speed.

15. A train control system comprising:
a plurality of ground control apparatuses for generating train control information for controlling running of a train;
one or a plurality of wireless base stations that are connected to each of the ground control apparatuses, the wireless base station accepting and wirelessly transmitting the train control information;
an onboard wireless station that is mounted on the train, the onboard wireless station receiving the train control information transmitted from the wireless base stations; and
an onboard control apparatus that is connected to the onboard wireless station, the onboard control apparatus controlling the running of the train based on the train control information notified from the onboard wireless station,
the ground control apparatus including
a predicted passage time calculation unit for calculating a predicted passage time of a reservation start point at which a reservation for a wireless channel allocated for a handover target wireless base station is started, based on a handover point, calculated or notified train speed, and train present track position information notified from the train through the onboard wireless station, the handover point being stored as a point at which communication target wireless base stations are switched, a ground control apparatus determination unit for determining whether a handover source wireless base station and the handover destination wireless base station are under control of the same ground control apparatus, and notifying the determination result, a wireless channel reservation request unit for requesting a ground control apparatus having control over the handover destination wireless base station to reserve a wireless channel if it is notified that the handover source wireless base station and the handover destination wireless base station are not under the control of the same ground control apparatus, a reservation result reception unit for receiving a result of reservation of a wireless channel reserved by a ground control apparatus not under control, a reservation request reception unit for receiving a request to reserve a wireless channel from the ground control apparatus not under control, a wireless channel reservation unit for performing, if it is notified that the handover source wireless base station and the handover destination wireless base station are under the control of the same ground control apparatus, processing of reserving a wireless channel allocated to the handover target wireless base station based on usage of the wireless channel and the predicted passage time, and for performing, if a reservation request is notified from the reservation request reception unit, processing of reserving a wireless channel allocated to the reservation-requested wireless base station based on usage of the wireless channel, a wireless channel reservation result notification unit for receiving a wireless channel reservation result of the wireless channel reservation unit when the handover source wireless base station and the handover destination wireless base station are under the control of the same ground control apparatus, and notifying the wireless channel reservation result to the handover source wireless base station, and a wireless channel reservation request result notification unit for receiving a wireless channel reservation result of the wireless channel reservation unit when the handover source wireless base station and the handover destination wireless base station are not under the control of the same ground control apparatus, and notifying the wireless channel reservation result to a ground control apparatus having control over the handover target wireless base station.

16. The train control system according to claim 15, wherein the ground control apparatus further includes a train speed calculation unit for calculating the train speed based on present track position information notified from the train through the onboard wireless station.

17. The train control system according to claim 15, wherein information on the train speed needed to calculate the predicted passage time is calculated by the train and notified to the ground control apparatus.

18. The train control system according to claim 15, wherein information on the train speed needed to calculate the predicted passage time is calculated by the train and notified to the ground control apparatus.

19. A handover method in a train control system, the train control system configured to wirelessly perform communication between an onboard wireless station connected to an onboard control apparatus mounted on a train and a wireless base station connected to a ground control apparatus for controlling running of the train, the handover method comprising:

a predicted passage time calculation step of calculating a predicted passage time of the train at a handover point based on the handover point and train speed, the handover point being stored as a point at which communication target wireless base stations are switched;

a wireless channel reservation step of performing processing of reserving a wireless channel of a handover target wireless base station based on usage of a wireless channel allocated to the handover destination wireless base station and the predicted passage time; and a wireless channel reservation result notification step of notifying a wireless channel reservation result in the wireless channel reservation step to a handover source wireless base station as one of pieces of the train control information.

20. A handover method in a train control system, the train control system configured to wirelessly perform communication between an onboard wireless station connected to an onboard control apparatus mounted on a train and a wireless base station connected to a ground control apparatus for controlling running of the train, the handover method comprising:

a predicted passage time calculation step of calculating a predicted passage time of the train at a handover point based on the handover point and train speed, the handover point being stored as a point at which communication target wireless base stations are switched;

a determination step of determining whether a handover source wireless base station and a handover destination wireless base station are under control of the same ground control apparatus;

a wireless channel reservation request step of requesting a ground control apparatus having control over the handover destination wireless base station to reserve a wireless channel if the handover source wireless base station and the handover destination wireless base station are not under the control of the same ground control apparatus;

a wireless channel reservation step of performing, if the handover source wireless base station and the handover destination wireless base station are under the control of the same ground control apparatus, processing of reserving a wireless channel of the handover destination wireless base station based on usage of a wireless channel allocated to the handover destination wireless base station and the predicted passage time, and performing, if a reservation request for a wireless channel is received from another ground control apparatus, processing of reserving a wireless channel based on usage of a wireless channel allocated to the reservation-requested wireless base station;

a wireless channel reservation result notification step of notifying a wireless channel reservation result to the handover source wireless base station when the handover source wireless base station and the handover destination wireless base station are under the control of the same ground control apparatus; and a wireless channel reservation request result notification step of notifying a wireless channel reservation result to a ground control apparatus having control over the handover destination wireless base station when the handover source wireless base station and the handover destination wireless base station are not under the control of the same ground control apparatus.

* * * * *